United States Patent
Horowitz et al.

(10) Patent No.: US 12,260,248 B2
(45) Date of Patent: Mar. 25, 2025

(54) SYSTEMS AND METHODS FOR PERFORMING MULTIPLICATION OF ONE OR MORE MATRICES USING MULTI-THREAD SYSTOLIC ARRAYS

(71) Applicant: Huawei Technologies Co., Ltd., Shenzhen (CN)

(72) Inventors: Tal Horowitz, Munich (DE); Uri Weiser, Munich (DE); Zuguang Wu, Hangzhou (CN); Huibin Luo, Hangzhou (CN); Yoni Choukroun, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 1155 days.

(21) Appl. No.: 16/800,799

(22) Filed: Feb. 25, 2020

(65) Prior Publication Data
US 2020/0192701 A1 Jun. 18, 2020

Related U.S. Application Data

(63) Continuation of application No. PCT/EP2017/073854, filed on Sep. 21, 2017.

(51) Int. Cl.
*G06F 9/48* (2006.01)
*G06F 9/38* (2018.01)
*G06F 15/80* (2006.01)

(52) U.S. Cl.
CPC .............. *G06F 9/4843* (2013.01); *G06F 9/38* (2013.01); *G06F 9/3851* (2013.01); *G06F 9/3888* (2023.08); *G06F 15/8046* (2013.01)

(58) Field of Classification Search
None
See application file for complete search history.

(56) References Cited

U.S. PATENT DOCUMENTS 5,274,832 A * 12/1993 Khan ........................ G06N 3/10
708/424
5,337,395 A * 8/1994 Vassiliadis ............... G06N 3/04
706/42

(Continued)

FOREIGN PATENT DOCUMENTS

| TW | 201706871 A | 2/2017 |
|---|---|---|
| WO | 9526531 A1 | 10/1995 |
| WO | 2009066760 A1 | 5/2009 |

OTHER PUBLICATIONS

Sernec et al., "Multithreaded systolic/SIMD DSP array processor-MUS2DAP," Signal Processing Systems 1997, SIPS 97—Design and Implementation Leicester, UK, pp. 448-457, Institute of Electrical and Electronics Engineers, New York, New York (Nov. 1997).

(Continued)

*Primary Examiner* — Meng Ai T An
*Assistant Examiner* — Zujia Xu
(74) *Attorney, Agent, or Firm* — Leydig, Voit & Mayer, Ltd.

(57) ABSTRACT

A multi-thread systolic array includes a plurality of processing elements, each including a processor. Each of the processing elements is configured to: receive a plurality of first inputs from a respective first input source; receive a plurality of second inputs from a respective second input source; the plurality of first inputs and the plurality of second inputs being arranged as a plurality of pairs corresponding to a plurality of threads; schedule, for each operation cycle of the processor, a certain thread of the plurality of threads; and execute a computation operation for the certain thread.

18 Claims, 7 Drawing Sheets

(56) References Cited

U.S. PATENT DOCUMENTS

| | | | |
|---|---|---|---|
| 5,887,006 A * | 3/1999 | Sharma | H03M 13/151 |
| | | | 708/492 |
| 7,327,722 B1 * | 2/2008 | Pipher | H04L 12/5601 |
| | | | 370/352 |
| 7,584,342 B1 | 9/2009 | Nordquist et al. | |
| 9,710,265 B1 | 7/2017 | Temam et al. | |
| 2006/0248317 A1 | 11/2006 | Vorbach et al. | |
| 2010/0250640 A1 | 9/2010 | Seki | |
| 2015/0278095 A1 * | 10/2015 | Funazaki | G06F 15/17375 |
| | | | 711/147 |
| 2016/0342892 A1 * | 11/2016 | Ross | G06N 3/063 |
| 2017/0012906 A1 * | 1/2017 | Szilagyi | H04B 1/0483 |
| 2017/0103314 A1 | 4/2017 | Ross | |
| 2017/0103316 A1 | 4/2017 | Ross et al. | |
| 2017/0124025 A1 | 5/2017 | Gokmen | |
| 2018/0322390 A1 * | 11/2018 | Das | G06F 7/5443 |

OTHER PUBLICATIONS

Lin et al., "Design space exploration for sparse matrix-matrix multiplication on FPGAs," 2010 Conference on Field-Programmable Technology (FPT), Tsinghua University, Beijing, China, pp. 369-372, Institute of Electrical and Electronics Engineers, New York, New York (2010).

* cited by examiner

US 12,260,248 B2

SYSTEMS AND METHODS FOR PERFORMING MULTIPLICATION OF ONE OR MORE MATRICES USING MULTI-THREAD SYSTOLIC ARRAYS

CROSS-REFERENCE TO RELATED APPLICATION

This application is a continuation of International Application No. PCT/EP2017/073854, filed on Sep. 21, 2017, the disclosure of which is hereby incorporated by reference in its entirety.

TECHNICAL FIELD

The present disclosure, in some embodiments thereof, relates to matrix multiplication and, more specifically, but not exclusively, to systems and methods for multiplication of one or more matrices.

BACKGROUND

Matrix and vector multiplication are basic operations used in a variety of processing methods, for example, to compute neural networks inference and/or training of neural networks. Computationally efficiency systems and/or methods are sought to quickly perform the matrix multiplications within a reasonable amount of time using a reasonable amount of computational resources (i.e., memory and/or processing hardware). For example, neural network hardware accelerators need to have high data throughput and efficient energy consumption to process different neural networks on large volumes of different inputs.

SUMMARY

The present disclosure provides a multi-threaded systolic array, and an apparatus, a method, a computer program product, and a system for operating the multi-threaded systolic array.

According to a first aspect of the present disclosure, a multi-thread systolic array includes a plurality of processing elements, each including a processor. Each of the processing elements is configured to: receive a plurality of first inputs from a respective first input source; receive a plurality of second inputs from a respective second input source, the plurality of first inputs and the plurality of second inputs being arranged as a plurality of pairs corresponding to a plurality of threads; schedule, for each operation cycle of the processor, a certain thread of the plurality of threads; and execute a computation operation for the certain thread.

According to a second aspect of the present disclosure, a method of operating a multi-thread systolic array includes: performing, for each processing element of a plurality of processing elements of the multi-thread systolic array: receiving a plurality of first inputs from a respective first input source; receiving a plurality of second inputs from a respective second input source, the plurality of first inputs and the plurality of second inputs being arranged as a plurality of pairs corresponding to a plurality of threads; scheduling, for each operation cycle, a certain thread of the plurality of threads; and computing a computation operation for the certain thread.

The multi-thread systolic array improves utilization of the processing elements in comparison to other implementations (e.g., single thread systolic array) when the input data exhibits high weight sparsity and/or high input sparsity, for example, as exhibited by real life neural networks.

Rather than handling only one matrix operation at a time (e.g., as performed by the single thread systolic array implementation), the computational resources of the multi-thread systolic array are reused for other matrix operation(s) instead of executing meaningless operations on the current matrix operation, improving computational efficiency.

Incorporation of the multi-thread systolic array in the neural network processing system improves the efficiency of execution of multiple different neural networks on a large volume of different inputs in comparison to other implementations of neural network processing systems, for example, in terms of increased data throughput, and/or improvement in efficiency of energy consumption.

In a further implementation form of the first and second aspects of the present disclosure, the plurality of processing elements are arranged as a two dimensional array such that a plurality of first outputs of a first processing element are provided as the plurality of first inputs into a second adjacent processing element, and a plurality of second outputs of the first processing element are provided as the plurality of second inputs into a third adjacent processing element.

In a further implementation form of the first and second aspects of the present disclosure, the scheduling is performed according to available non-impacting values of the certain thread. The non-impacting values are input values that do not significantly impact values computed by the processor.

In a further implementation form of the first and second aspects of the present disclosure, the processor is configured to parallel execute the computation operation for the certain thread and execute for each respective thread of the other threads, a bypass operation when at least one of the values of the respective thread is a non-impacting value, or a stalling operation when at least one of the values of the respective thread is an impacting value.

The computational performance of the multi-thread systolic array is increased by the parallel processing, since execution of two or more threads in parallel takes about half the time or less than would otherwise be required when the threads are sequentially executed one after the other, for example, by the single thread systolic array implementation.

In a further implementation form of the first and second aspects of the present disclosure, computation operation is executed by a computation component, the bypass operation is executed by a shifting path component, and the stalling operation is executed by a stalling component. The computation operation of the computation component is executed independently of bypass operation of the shifting path component and the stalling operation of the stalling component.

In a further implementation form of the first and second aspects of the present disclosure, the processor is configured to parallel process a plurality of bypass operations for the plurality of threads when the plurality of threads include non-impacting values.

In a further implementation form of the first and second aspects of the present disclosure, the processor is configured to perform a bypass operation for each thread that includes non-impacting values for the respective first inputs and/or second inputs.

In a further implementation form of the first and second aspects of the present disclosure, the processor is configured to assign different layers of a neural network to different threads, and to select between the different threads according to a bandwidth of the corresponding layer. The first input denotes activation input of the neural network and the second input denotes weights of the neural network.

The computational efficacy of the multi-threaded systolic array is maintained at a high level with varying neural networks.

The multi-thread systolic array adapts to different bandwidth requirements of input and/or weights (e.g., of different network layers of a neural network, for example, fully connected layers and/or convolutional layers), which improves computational efficiency and/or energy utilization, for example, in comparison to other implementations (e.g., single thread systolic array implementation) that do not consider and/or adapt to bandwidth variance.

For example, the single thread systolic array implementation is only able to process one network layer at a time for most of the real life neural networks, which underutilizes the single thread systolic array as the array is waiting for weights and/or input data, and/or the array is too slow to realize the performance needed. As such, the single thread systolic array cannot match the neural network accelerator memory subsystem bandwidth, resulting in reduced computational performance and/or energy utilization in comparison to the multi-thread systolic array that adapts to the bandwidth.

In a further implementation form of the first and second aspects of the present disclosure, each of the plurality of processing elements includes at least one first suspension buffer storing data for the plurality of first inputs and at least one second suspension buffer storing data for the plurality of second inputs when the processor of the respective processing element is busy processing the certain thread.

In a further implementation form of the first and second aspects of the present disclosure, the processor is configured to shift non-impacting value inputs from the plurality of first inputs to the plurality of first outputs and from the plurality of second inputs to the plurality of second outputs.

In a further implementation form of the first and second aspects of the present disclosure, the shifting of the non-impacting value inputs is performed without computing the multiplication of the non-impacting value inputs.

In a further implementation form of the first and second aspects of the present disclosure, a clock of the computation component executing the computation operation is gated when the plurality of first inputs or the plurality of second inputs have a non-impacting value.

Shutting down power to the processor (optionally shutting down power to the computation component of the processor) for non-impacting values reduces energy consumption. As discussed herein, no computation operation is performed for non-impacting values.

In a further implementation form of the first and second aspects of the present disclosure, the multi-thread systolic array is configured to compute a plurality of matrix multiplications from data provided by the plurality of threads.

In a further implementation form of the first and second aspects of the present disclosure, the result of the computation operation is one of: locally stored at each of the plurality of processing elements and shifted as output to the second and third adjacent processing elements, and used as a partial sum input for the next computation from the corresponding certain first input and the corresponding certain second input.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
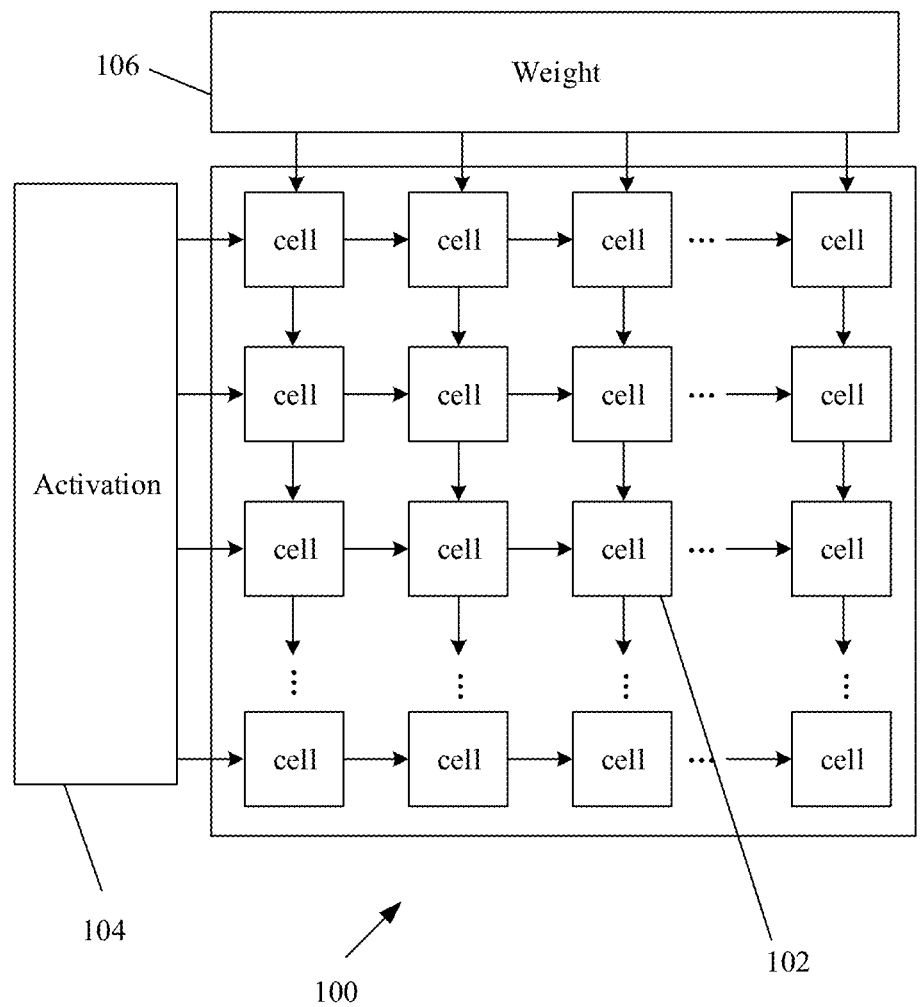
FIG. 1 is a schematic of an exemplary implementation of a standard systolic array, useful to help understand some embodiments of the present disclosure.

The present disclosure, in some embodiments thereof, relates to matrix multiplication and, more specifically, but not exclusively, to systems and methods for multiplication of one or more matrices.

An aspect of some embodiments of the present disclosure relate to methods, systems, and/or an apparatus for computing a computation operation (optionally, multiplication and addition) of a certain thread of multiple available threads by each processing element of a multi-thread systolic array. Each processing element of the multi systolic array includes one or more processors that each receive multiple first inputs and multiple second inputs. The first and second inputs are arranged as pairs, where each pair corresponds to a thread. A certain thread of the multiple threads is scheduled, per operation cycle, for execution of the computation operation by each processor of the respective processing element of the multi-thread systolic array.

The scheduling is performed according to available impacting (e.g., non-zero) values of the certain thread. A bypass operation is performed for the other non-scheduled threads having non-impacting (e.g., unavailable data, zero) values, providing the non-impacting values as output (optionally to one or more adjacent processing elements). The bypassing is performed without execution of the computation operation. A stall operation is performed for the other non-scheduled threads having impacting values. The computation operation is performed in parallel to, and independently of, the bypass operation(s) and the stalling operation(s). Multiple bypass operations are performed in parallel.

The multi-thread systolic array improves utilization of the processing elements in comparison to other implementations (e.g., single thread systolic array as described with reference to FIG. 1) when the input data exhibits high weight sparsity and/or high input sparsity, for example, as exhibited by real life neural networks. Rather than handling only one matrix operation at a time (e.g., as performed by the single thread systolic array implementation), the computational resources of the multi-thread systolic array are reused for other matrix operation(s) instead of executing meaningless operations on the current matrix operation, improving computational efficiency.

Incorporation of the multi-thread systolic array in a neural network processing system improves the efficiency of execution of multiple different neural networks on a large volume of different inputs in comparison to other implementations of neural network processing systems, for example, in terms of increased data throughput, and/or improvement in efficiency of energy consumption.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is noted that the term matrix described herein may sometimes be interchanged with the term vector.

As used herein, the term non-impacting value means a value of the input(s) (into the respective processing element) that does not significantly impact the value(s) computed by the respective processing element when the computation operation is performed. For example, zero values, values close to zero, and/or other values defined according to a requirement (e.g., defined range, set of rules, statistical tolerance requirement) that do not significantly affect other values when the computation operation (e.g., multiplication and add) is executed. For example, a zero input value multiplied by another input value produces a zero output value. The zero input value is non-impacting on the output value(s), since the zero output value is unaffected by the computation operation. The zero output value is produced both by the bypass operation (described herein) and by the computation operation, which makes the computation operation redundant, as described herein in additional detail.

As used herein, the term impacting value means a value of the input(s) that significantly impacts the outputted value(s) when the computation operation is performed. For example, non-zero values, and/or other values defined according to the requirement that significantly affect other values when the computation operation is executed. The non-zero input value is impacting on the output value(s), since the first and/or second input value is affected by the computation operation. For example, a non-zero (such as significantly far from zero) value multiplied by another non-zero value significantly affects the outputted value(s). The outputted value(s) is significantly different than either of the inputted values.

Reference is now made to FIG. 1, which is a schematic of an exemplary implementation of a standard systolic array 100, useful to help understand some embodiments of the present disclosure. Standard systolic array 100 includes hardware designed to perform matrix and/or vector multiplication, for example, as a neural network hardware accelerator for accelerating neural network based applications. In contrast to the multi-threaded systolic array described herein, standard systolic array 100 is a single threaded systolic array implementation. Due to the described inefficient operation of standard systolic array 100, the average utilization and/or power efficiency is relatively low, in comparison to the multi-thread systolic array described herein.

Systolic array 100 includes multiple cells (one cell 102 is marked for clarity as an example) arranged in a two dimensional array. An activation input component 104 provides activation input of the neural network along a first dimension of systolic array 100. A weight input component 106 provides weight input of the neural network along a second dimension of systolic array 100. Each respective cell 102 computes a product of the activation input and the weight input received by the respective cell. The activation input is shifted along the first dimension while the weight input is shifted along the second dimension of systolic array 100.

The present inventors realized that in practice, the utilization, computational efficiency, and/or energy consumption efficiency of standard systolic array 100 is low, for example, in processing real life neural networks. Inventors realized that the low utilization of standard systolic array 100 arises from high levels of weight and/or input sparsity that exist in real life neural networks (i.e., sparse matrices and/or sparse vectors), since standard systolic array 100 is designed for dense matrices and/or vectors. In contrast to the multi-threaded systolic array described herein, which operates in accordance with input and/or weight sparsity, standard systolic array 100 is unable to adapt according to input and/or weight sparsity.

Moreover, the present inventors realized that different network layers require different bandwidth of inputs and/or weights for efficient computation (e.g., fully connected layers and/or convolutional layers), which cannot be met by standard systolic array 100. The performance and/or energy consumption of standard systolic array 100 cannot match the neural accelerator memory subsystem bandwidth. Since standard systolic array 100 is only able to process one neural network layer at a time for most real life neural networks, systolic array 100 remains underutilized while waiting for weights and/or activation input data, and/or systolic array 100 may be too slow to realize the required performance.

In addition, the present inventors realized that since standard systolic array 100 is only able to process one matrix operation at a time, the computational resources of standard systolic array 100 cannot be reused for another matrix operation, but rather are used to execute meaningless operations on the current matrix operation, for example, multiplication by zero. Moreover, standard systolic array 100 is unable to distinguish between a matrix and/or vector element that has meaningful value (e.g., non-zero value) that requires computation and elements that have no meaningful values, (e.g., zero values) that do not require a computational operation (e.g., since multiplication by zero is zero).

In contrast, the multi-threaded systolic array described herein is designed to schedule its computational resources for processing meaningful operations (e.g., that result in non-zero values) while diverting the computational resources away from meaningless operations (e.g., that result in zero values).

Figure 2:
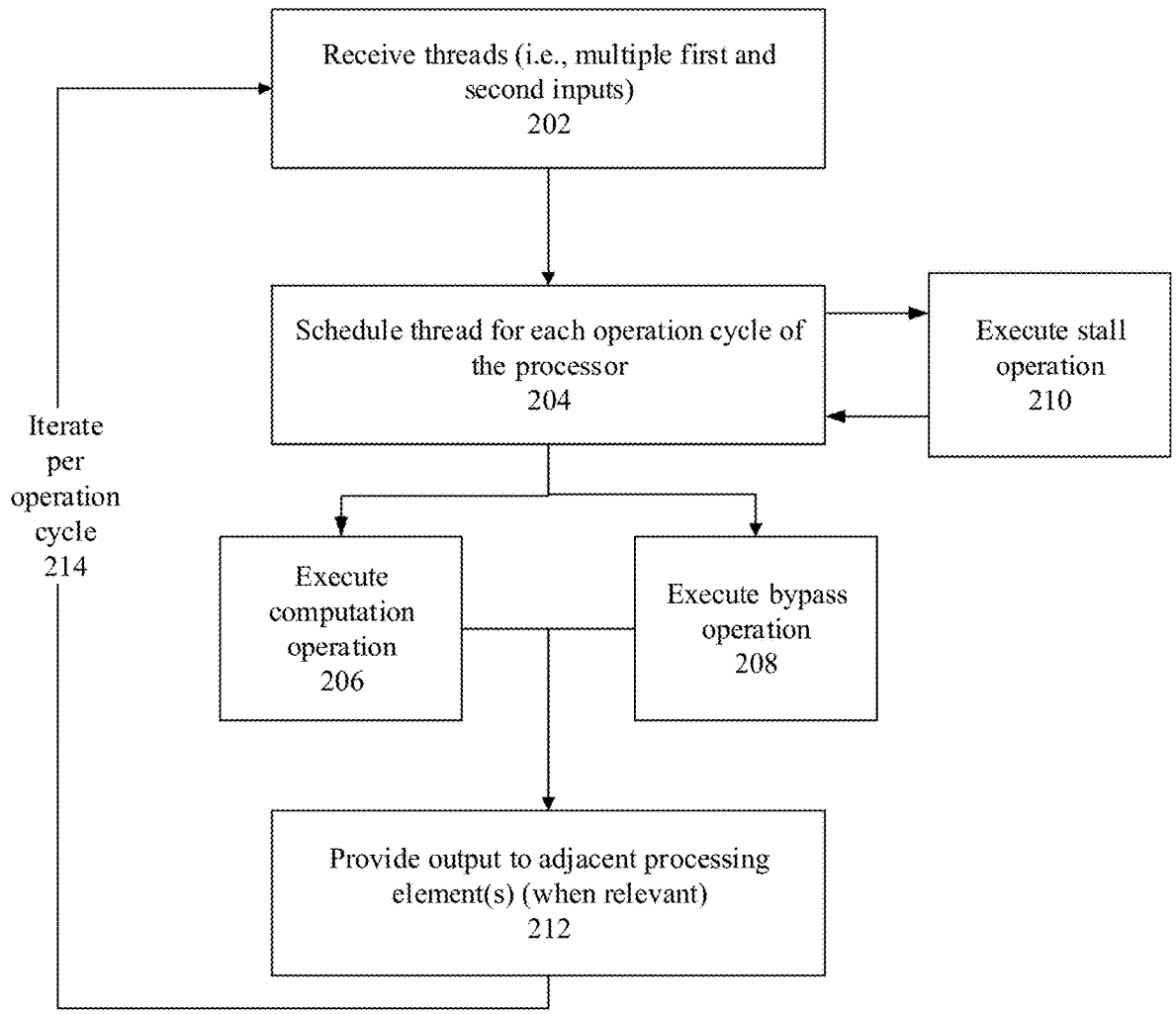
FIG. 2 is a flowchart of a method of operation of a multi-thread systolic array, in accordance with some embodiments of the present disclosure.
Figure 3A:
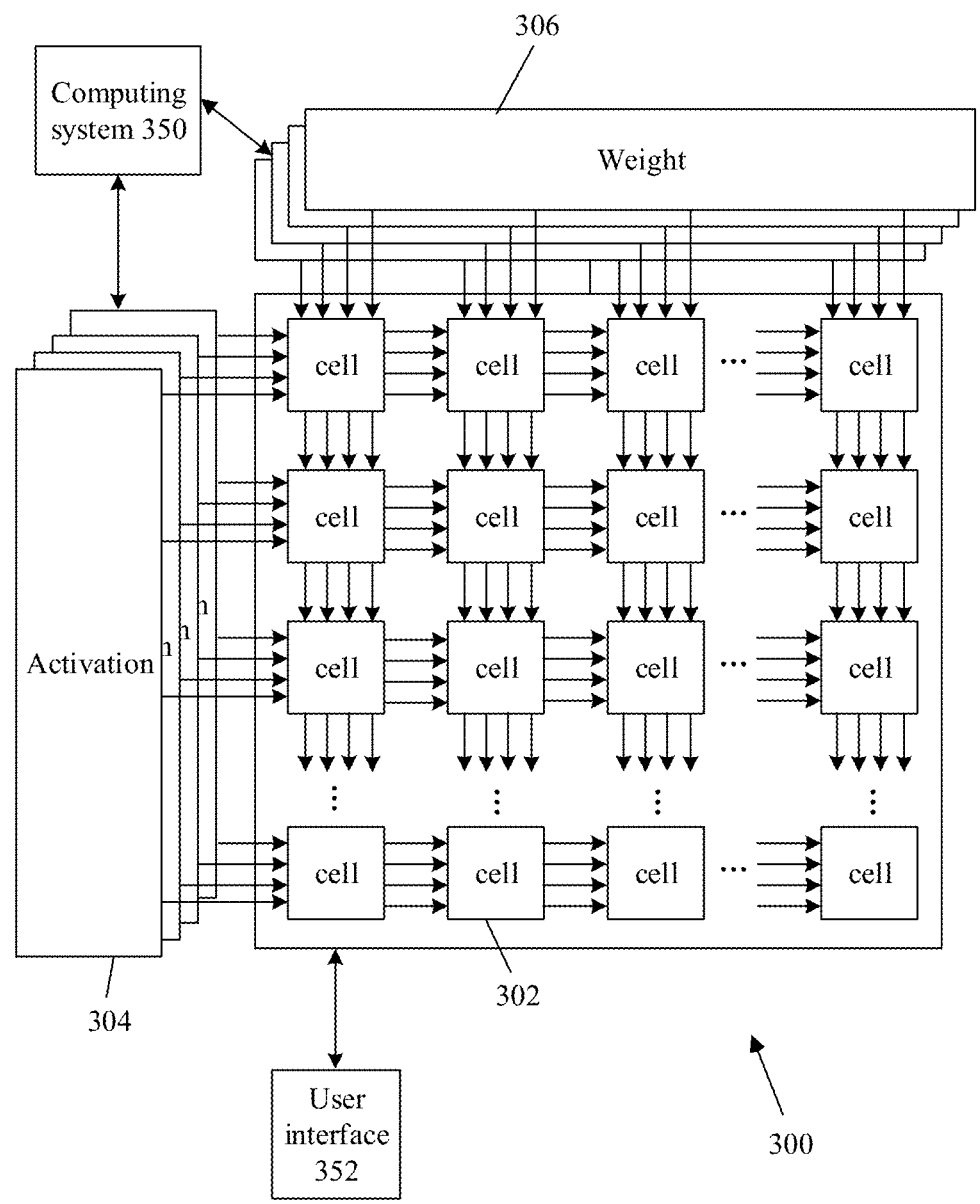
FIG. 3A is a block diagram of a multi-thread systolic array including multiple processing elements each designed for parallel execution of multiple operations, in accordance with some embodiments of the present disclosure.
Figure 3B:
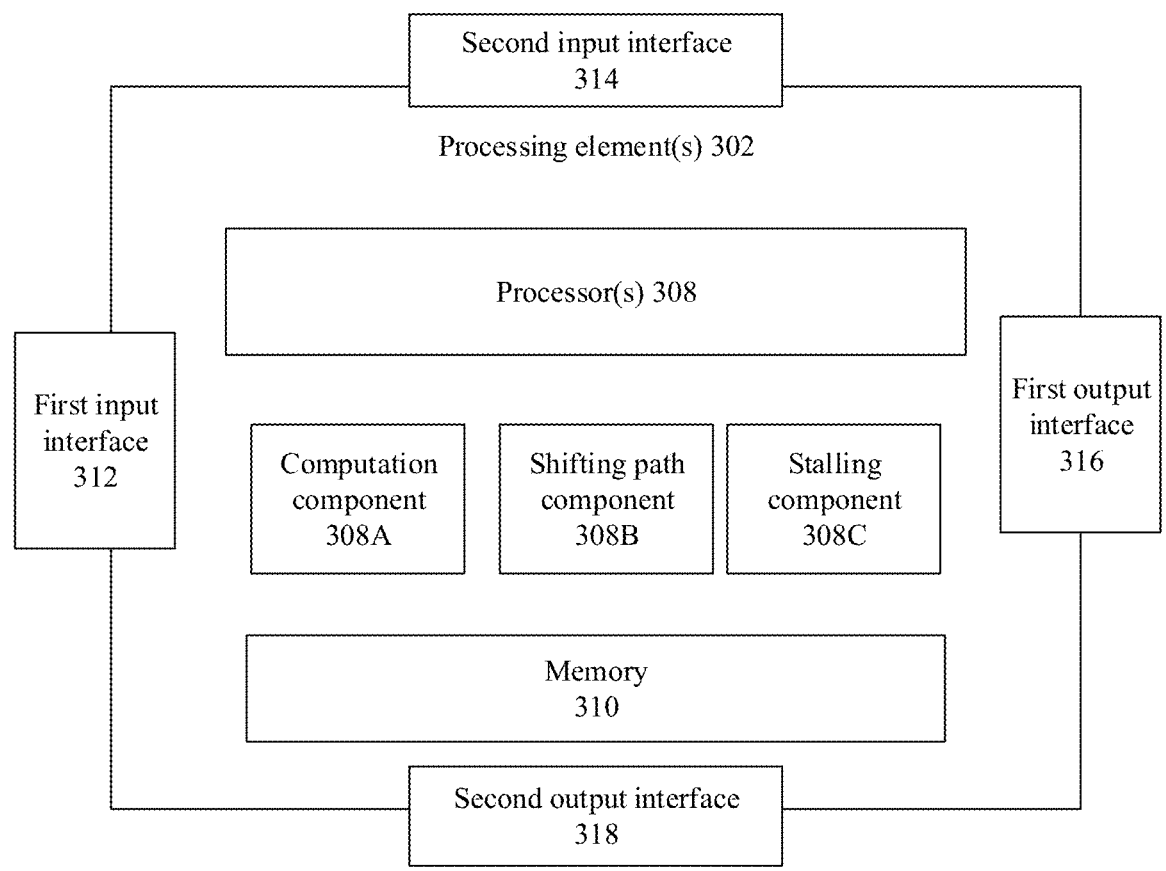
FIG. 3B is a block diagram providing details of one processing element of the multi-thread systolic array, in accordance with some embodiments of the present disclosure.

Reference is now made to FIG. 2, which is a flowchart of a method of operation of a multi-thread systolic array, in accordance with some embodiments of the present disclosure. Reference is also made to FIG. 3A, which is a block diagram of a multi-thread systolic array 300 including multiple processing elements 302 each designed for parallel execution of multiple operations for multiple threads, in accordance with some embodiments of the present disclosure. Reference is also made to FIG. 3B, which is a block diagram providing details of one processing element 302 of multi-thread systolic array 300, in accordance with some embodiments of the present disclosure. The method described with reference to FIG. 2 may be implemented by multi-thread systolic array 300 described with reference to FIG. 3A and processing elements 302 described with reference to FIG. 3B.

Referring now to FIG. 3A, multi-thread systolic array 300 may be implemented as a hardware component, a software component, or as a hardware and software mix (e.g., hardware may include code instructions stored in a data storage device for execution by one or more processors). Multi-thread systolic array 300 may be implemented as an external component (e.g., standalone unit) in communication with another computing system 350, as a component for integration with computing system 350 (e.g., hardware accelerator card that is plugged into an existing port of the computing system), and/or integrated within another computing system 350 (e.g., designed and built as an integral part of another system, for example, designed as features of a processing array).

Multi-thread systolic array 300 may be designed to provide computationally efficient matrix multiplication services (e.g., in terms of reduced processing time) to computing system 350. For example, computing system 350 may be executing code instructions of a neural network(s), and multi-thread systolic array 300 provides reduced processing time in performing matrix multiplications for training the neural network(s) and/or computing results by trained neural network(s).

Exemplary computing systems 350 that may be in communication with multi-thread systolic array 300 include for example, one of more of: a server, a computing cloud, a computer network, a virtual machine(s) (e.g., hypervisor, virtual server), a single computing device (e.g., client terminal, mobile device), and a group of computing devices arranged in parallel.

Multi-thread systolic array 300 includes a first input source 304 that provides multiple first inputs to each member of a first set of processing element 302 of multi-thread systolic array 300, for example activation input when computing a matrix of a neural network. Multi-thread systolic array 300 includes a second input source 306 that provides multiple second inputs to each member of a second set of processing elements 302 of multi-thread systolic array 300, for example, weights when computing the matrix of the neural network. First input source 304 and second input source 306 may be implemented, for example, by computing system 350 that is executing computation. For example, the first input source 304 and second input source 306 may provide input into respective processing elements 302 over a bus, local network, or other communication channels.

Multi-thread systolic array 300 is designed to compute multiple of matrix multiplications from data provided by the threads.

Processing elements 302 may be arranged, for example, as a two dimensional square array, a two dimensional rectangular array, a two dimensional triangular array, or other architectures, which may vary, for example, according to the executing application (e.g., neural network).

Multi-threaded systolic array 300 may be in communication (directly, and/or indirectly via other computing system 350) with a user interface 352 that presents data to a user and/or includes a mechanism for entry of data, for example, one or more of: a touch-screen, a display, a keyboard, a mouse, a stylus, voice activated software, and a microphone.

Referring now to FIG. 3B, each processing element 302 includes one or more processors 308, implemented as for example, central processing unit(s) (CPU), graphics processing unit(s) (GPU), field programmable gate array(s) (FPGA), digital signal processor(s) (DSP), application specific integrated circuit(s) (ASIC), customized circuit(s), and/or specialized hardware accelerators. Processor(s) 308 may be implemented as a single processor, a multi-core processor, and/or a cluster of processors arranged for parallel execution (which may include homogenous and/or heterogeneous processor architectures). It is noted that processor(s) 308 may be designed to implement in hardware one or more features stored as code in memory 310.

The following components of processing element 302 may be in communication with processor(s) 308, and/or may be implemented as components of processor(s) 308 (e.g., integrated therein):

Computation component 308A that executes the computation operation on the selected thread, as described herein.

Shifting path component 308B that executes the bypass operation, as described herein.

Stalling component 308C that executes the stalling operation, as described herein.

Computation component 308A is executed independently of (i.e., in parallel to) shifting path component 308B and/or stalling component 308C. The computational performance of the multi-thread systolic array is increased by the parallel execution performed by the components, since execution of two or more threads in parallel takes about half the time or less than would otherwise be required when the threads are sequentially executed one after the other, for example, by the single thread systolic array implementation.

Components 308A-C may be implemented as integrated features of one or more processor(s) 308, for example, as hardware features and/or code instructions that implement the respective feature when executed by processor(s) 308. Components 308A-C may be implemented as distinct components that are integrated with processor(s) 308 and/or are in communication with processor(s) 308, for example, hardware and/or code instructions designed to execute the respective feature defined by the respective component.

Processing element 302 may include memory 310 storing code instructions executable by processor(s) 308, for example, a random access memory (RAM), and/or read-only memory (ROM). Memory 310 may store intermediately computed results, and/or may store other data.

Processing element 302 may include a first input interface 312 for receiving input from first input source 304 and a second input interface 314 for receiving input from second input source 306, for example, a bus interface, and/or a network interface. The first inputs of first input interface 312 and the second inputs of second input interface 314 are arranged as pairs, where each pair is referred to herein as a thread.

Processing element 302 may include sum registers, for example, one sum register for each thread. Sum registers may be stored within memory 310, and/or within another data storage device.

Processing element 302 may include shifting paths for the first and second inputs respectively.

Optionally, isolated input/output ports (i.e., of interfaces 312-318) may be implemented for each thread. The isolated ports increase the data throughput.

First input interface 312 and/or second input interface 314 may be associated with one or more suspension buffers that store data received from respective first input source 304 and second input source 306. Each input may be associated with its own respective suspension buffer, and/or the set of inputs received from first input source 304 or second input source 306 may be associated with a respective combined suspension buffer. Suspension buffer may store the data received from respective first input interface 312 and/or second input interface 314 when processor(s) 308 is busy processing other received data (i.e., during an operation cycle).

Processing element 302 may include a first output interface 316 that provides output from one processing element 302 to an adjacent processing element, optionally into the first input interface of the other processing element. Processing element 302 may include a second output interface 318 that provides output from one processing element 302 to another adjacent processing element, optionally into the second input interface of the yet another processing element. It is noted that processing element 302 may include additional outputs, for example, according to the overall design of the multi-thread systolic array, and/or according to the computational operation(s) performed by the multi-thread systolic array.

Referring now back to FIG. 2, for clarity and simplicity of explanation, the method described with reference to FIG. 2 is discussed with reference to one processing element 302 of the multiple processing elements of multi-thread systolic array 300. The other processing elements 302 of multi-thread systolic array 300 operate in a similar manner.

At 202, multiple thread input is received. As discussed herein, each thread includes one of the first inputs paired with one of the second inputs. Multiple first inputs are received (optionally via first input interface 312) from first input source 304, for example, activation inputs of a neural network. Multiple second inputs are received (optionally via second input interface 314) from second input source 306, for example, weights of the neural network.

Each thread may denote one matrix operation.

The inputs may be implemented as separate input (e.g. queue) for each thread, or by a common input (e.g., queue) shared by two or more (e.g., all) threads.

At 204, a certain thread of the multiple threads is scheduled. The thread is scheduled for execution of the computation operation, as described with reference to act 206.

An example of a computation operation includes: multiplication and add (MULADD).

When multiple threads quality for execution of the computation operation, the certain thread may be selected from the other qualifying threads according to a priority requirement, for example, based on round-robin, random selection, a hierarchy, a set of rules, and/or a priority ranking (e.g., score).

The scheduling is performed according to operation cycles. Optionally, scheduling is performed for each operation cycle. During each operation cycle, one computation operation (as described with reference to act 208) is executed, optionally in parallel with one or more bypass operations (as described with reference to act 210) and/or stall operations (as described with reference to act 212). Alternatively, during each operation cycle, multiple bypass operations and/or stall operations may be executed in parallel. Each operation may be a component of a task, for example, a single task may include multiple operations.

The scheduling is performed according to available impacting values of the certain thread. Available data has a defined value and/or may be processed without additional delay.

When at least one of the first input and second input is not available for the certain thread, another thread is scheduled. Values may be unavailable, for example, when another process that provides the inputs has not yet completed operation (e.g., executing on computing system 350), due to memory bandwidth requirement, and/or when the values experience transmission delays.

Optionally, the processing element is executing computations for training a neural network, and/or for performing a computation of a result using a trained neural network. For the neural network application, the first input denotes activation input of the neural network and the second input denotes weights of the neural network. Optionally, different layers of the neural network are assigned to different threads. The processing element selects between the different threads according to bandwidth of the corresponding layer. The computational efficacy of the multi-threaded systolic array is maintained at a high level with varying neural networks.

The multi-thread systolic array adapts to different bandwidth requirements of input and/or weights (e.g., of different network layers of a neural network, for example, fully connected layers and/or convolutional layers), which improves computational efficiency and/or energy utilization, for example, in comparison to other implementations (e.g., single thread systolic array implementation) that do not consider and/or adapt to bandwidth variance. For example, the single thread systolic array implementation is only able to process one network layer at a time for most of the real life neural networks, which underutilizes the single thread systolic array as the array is waiting for weights and/or input data, and/or the array is too slow to realize the performance needed. As such, the single thread systolic array cannot match the neural network accelerator memory subsystem bandwidth, resulting in reduced computational performance and/or energy utilization in comparison to the multi-thread systolic array that adapts to the bandwidth.

Optionally, at 206, a computation operation is computed for the certain thread, for example, the product of the activation input and the corresponding weight input. The computation operation may be executed by the multiply and add component 308A of the respective processing element 302.

Optionally, a clock of computation component 308A executing the computation operation is gated when the first inputs and the second inputs (i.e., threads) have a non-impacting value. Shutting down power to the processor and/or the computation component for non-impacting values inputs reduces energy consumption. As discussed herein, no computation operation is performed for non-impacting values.

Optionally, the result of the computation operation is locally stored at the respective processing element 302, for example, by memory 310. Alternatively or additionally, the result is shifted as output to the adjacent processing elements. The shifted output is used by each respective adjacent processing element as a partial sum input for the next computation operation from the corresponding certain first input and the corresponding certain second input.

It is noted that the computation operation is not performed when one or both inputs are non-impacting values. By executing the computation operation for impacting significant values and avoiding executing the computation operation for unavailable and/or non-impacting values, the overall efficiency and/or performance of the multi-thread systolic array is increased (i.e., improved utilization of processing resources), and/or the power consumption per matrix operation decreases, for example, in comparison to the standard single thread systolic array.

Alternatively or additionally, at 208, a bypass operation is executed for each thread that includes non-impacting values for the respective first inputs and/or second inputs. The bypass operation may be executed by bypass component 308B of the respective processing element 302.

The bypass operation is performed by shifting the non-impacting value inputs from the first inputs (e.g., via interface 312) to the first outputs (e.g., via interface 316) and from the second inputs (e.g., via interface 314) to the second outputs (e.g., via interface 318). The shifting of the non-impacting values is performed without computing the computation operation of the impacting value inputs.

Optionally, multiple bypass operations may be executed in parallel for the threads when the threads include non-impacting values.

Alternatively or additionally, at 210, a stall operation is executed. The stall operation is executed when there is more than one thread that qualifies for processing by the computation operation, when at least one of the values of the first and second inputs of the respective thread is impacting. The stall operation is executed on the threads that have not been selected for processing by the computation operation.

The stall operation may be executed by stall component 308C of the respective processing element 302. Values that are being stalled by the stall operation may be locally stored, for example, within memory 310, and/or within the suspender queue(s) described herein.

At 212, outputs (i.e., results of the computation operation, and/or the bypassed data) is provided as input into one or more adjacent processing element, when relevant according to the location of the respective processing element within the multi-thread systolic array, and/or according to the architectural design of multi-thread systolic array.

Optionally, for the case depicted with reference to FIG. 3A, of a two dimensional square shaped multi-thread systolic array 300, first outputs (e.g., via first output interface 316) of the respective processing element 302 are provided as first inputs into a second adjacent processing element (e.g., via the first input interface 312 of the second adjacent processing element). Second outputs (e.g., via second output interface 318) of the first processing element are provided as second inputs into a third adjacent processing element (e.g. via the second input interface 314 of the third adjacent processing element).

At 214, one or more features described with reference to acts 202-212 are iterated, optionally per operation cycle.

Figure 4:
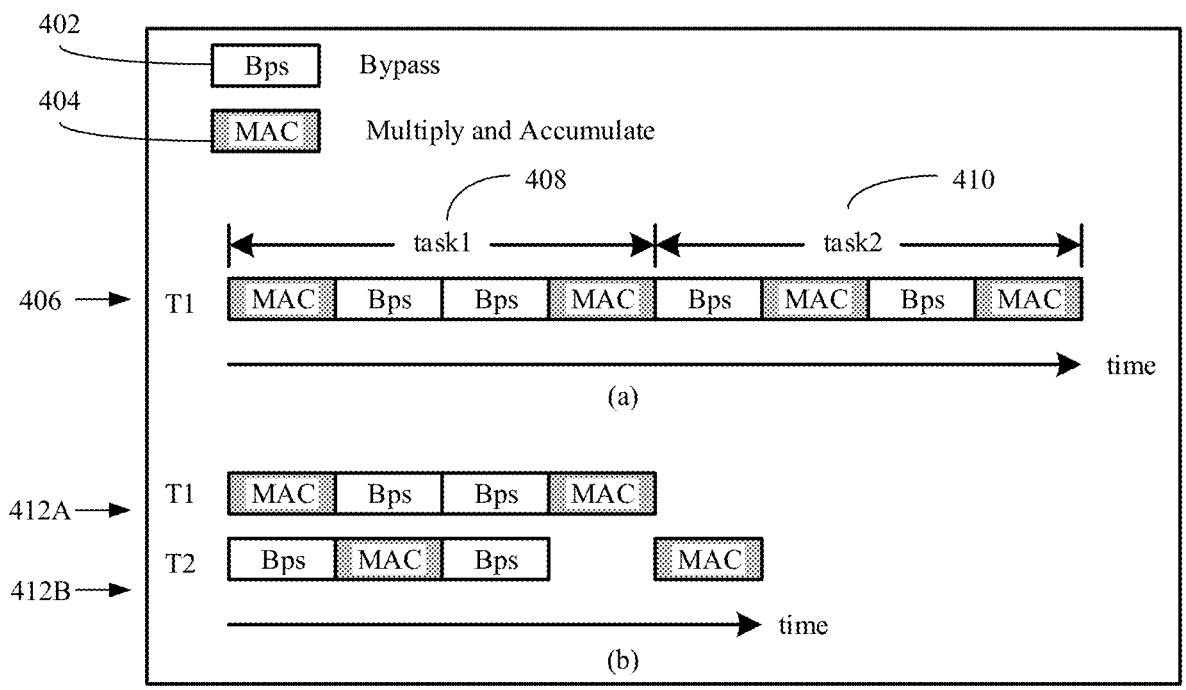
FIG. 4 is a schematic depicting a comparison between computational efficiency of a standard single thread systolic array, and the multi-thread systolic array described herein, in accordance with some embodiments of the present disclosure.

Reference is now made to FIG. 4, which is a schematic depicting a comparison between computational efficiency of a standard single thread systolic array, and the multi-thread systolic array described herein, in accordance with some embodiments of the present disclosure. For simplicity and clarity of explanation, a two thread implementation of the multi-thread systolic array is described. Bypass operations 402 are denoted as Bps. Multiple and accumulate operations 404 are denoted as MAC. Arrow 406 denotes an example of execution of task 1 408 and execution of task 2 410 by the single thread systolic array. A total of 8 operation cycles is required to sequentially process the operations defined by task 1 (i.e.,MAC, Bps, Bps, MAC) and task 2 (i.e., Bps, MAC, Bps, MAC). Arrows 412A-B denotes an example of execution of task 1 and task 2 by the two thread implementation of the multi-thread systolic array. Arrow 412A denotes execution by a first thread T1 of the two thread implementation of the multi-thread systolic array. Arrow 412B denotes execution by a second thread T2 of the two thread implementation of the multi-thread systolic array. A total of 5 operation cycles (or about half the processing time in comparison to the single threaded systolic array) are needed to parallel execute operations defined by task 1 and task 2, as the MAC operation is parallel executed with the Bps operation, or a certain Bps operation is parallel executed with another Bps operation.

Figure 5:
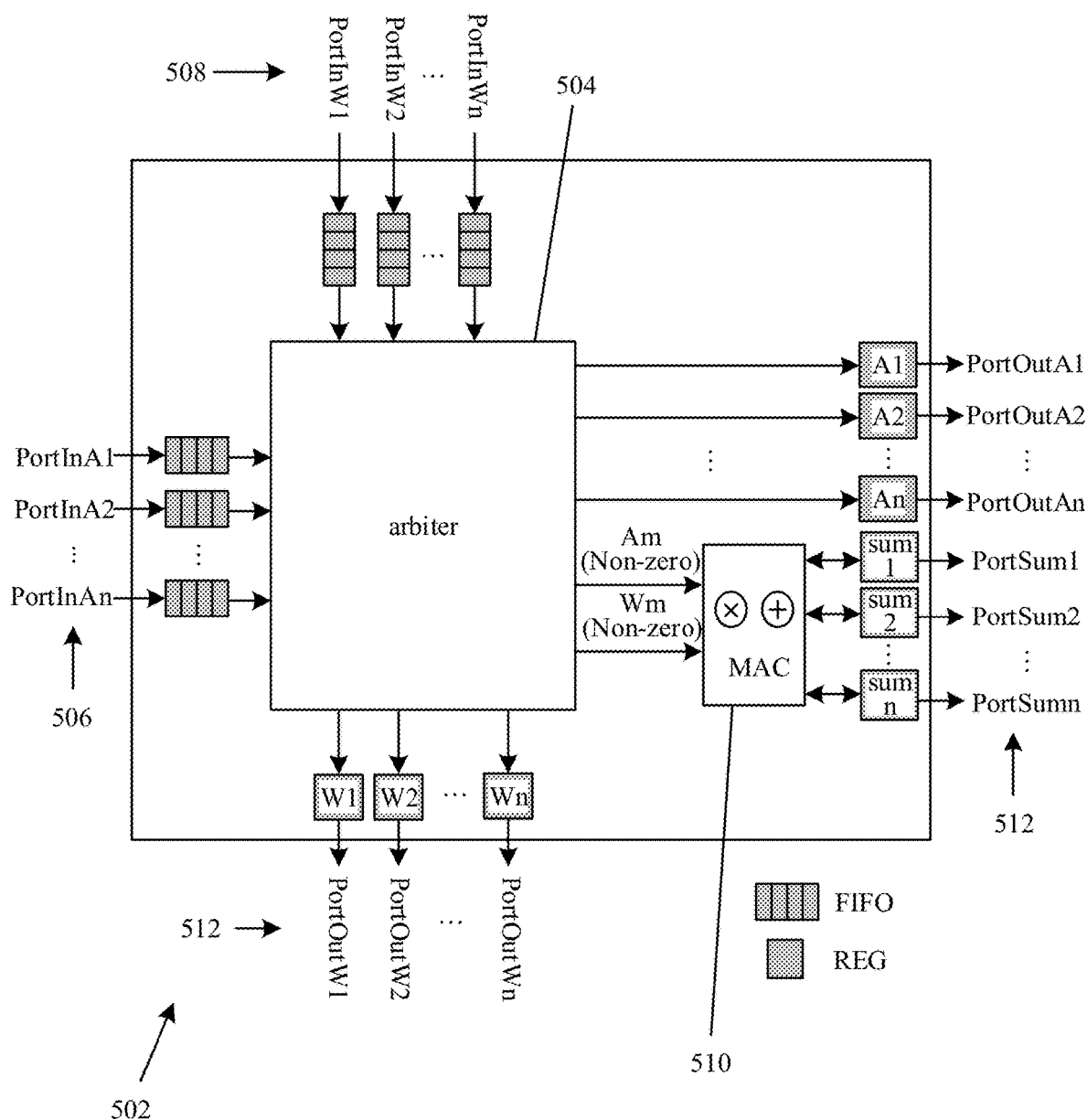
FIG. 5 is a schematic of an exemplary architecture of one processing element of the multi-thread systolic array, in accordance with some embodiments of the present disclosure.

Reference is now made to FIG. 5, which is a schematic of an exemplary architecture of one processing element 502 of the multi-thread systolic array, in accordance with some embodiments of the present disclosure. The other processing elements of the multi-threaded systolic array may be implemented based on the architecture described with reference to processing element 502.

An arbiter component 504 of processing element 502 identifies thread(s) that include available data. As discussed herein, each thread includes a pair of inputs, for example, a certain activation input of a set of activation inputs 506 and a certain weight input from a set of weight inputs 508. Arbiter component 504 schedules one thread from the threads identified as including available data, and directs (and/or provides) the input data of the scheduled thread to the MAC component 510 for processing. Arbiter component 504 decides which input data of the other threads is bypassed to output ports 512 (optionally to serve as input data of one or more other adjacent processing elements), for example, according to non-impacting data, as described herein. Arbiter component 504 and/or MAC component 510 may be implemented as a component of and/or a feature of the processor(s) of processing element 502.

Input ports 506 and 508 may include FIFO queues (first in first out), as described herein. Output ports 512 may include registers.

It is noted that for each thread, there are separate channels for shifting the inputs (e.g., activation and weight) to the adjacent cells (e.g., located to the right and down of processing element 502).

Figure 6:
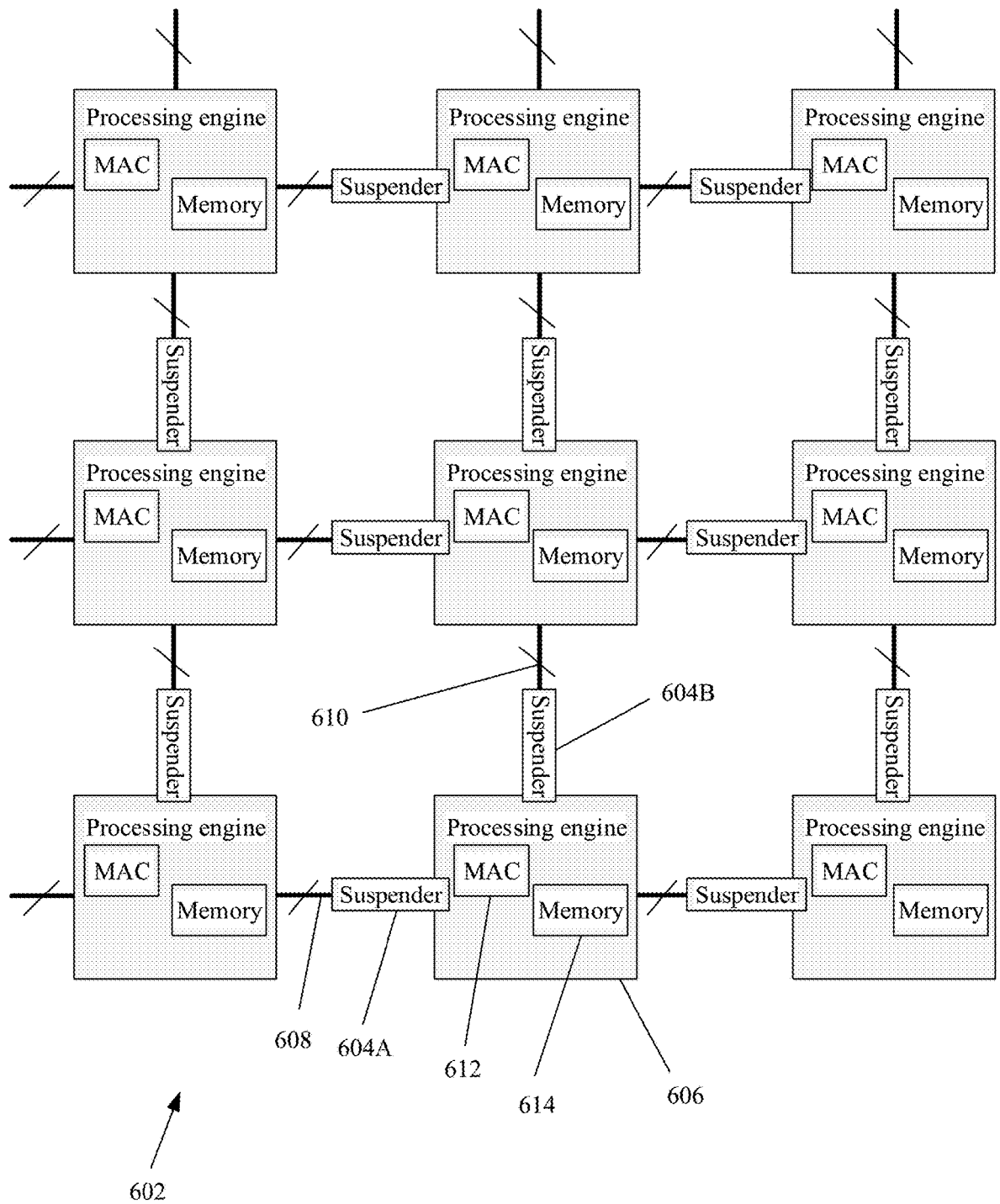
FIG. 6 is a schematic of an exemplary architecture of a multi-thread systolic array, including respective suspender queues (optionally a FIFO based implementation) for each input of each processing element, in accordance with some embodiments of the present disclosure.

Reference is now made to FIG. 6, which is a schematic of an exemplary architecture of a multi-thread systolic array 602, including respective suspender queues 604A-b (optionally a FIFO based implementation) for each input of each processing element 606, in accordance with some embodiments of the present disclosure. It is noted that a 3×3 processing element 606 array implementation of multi-thread systolic is depicted for example purposes only, and is not to be understood as size limiting.

Each processing element 606 includes multiple first inputs (collectively summarized as shown) 608 and multiple second inputs 610 (collectively summarized as shown). Each input 608 and 610 may associated with a respective suspender queue 604A-B, or a common suspender queue may be implemented for multiple inputs. Suspender queue 604 may be implemented as a common queue for the set of first inputs 608 and another queue 604 for the set of second inputs 610, or each individual first 608 and second 610 input is associated with its own queue 604.

During each processing cycle (e.g., during which one set of multiple operations are performed in parallel, as described herein) the processor of each respective processing element 606 analyzes its respective inputs 608 and 610 and schedules one thread for MAC operation execution, as described herein. The data of the other non-scheduled threads that have available and meaningful data is stalled within the respective queue 604, until the currently executing MAC operation is completed.

Each processing element 606 includes a respective MAC component 612 and memory 614, as described herein.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processors will be developed and the scope of the term processor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A multi-thread systolic array comprising:
    a plurality of processing elements each including a processor, a first input interface, a second input interface, a computation component, a shifting path component and a stalling component;
    a respective suspender queue for each input of the plurality of processing elements,
    wherein each of the processing elements is configured to:
    receive a plurality of first inputs by the first input interface from a respective first input source;
    receive a plurality of second inputs by the second input interface from a respective second input source,
    wherein the plurality of first inputs and the plurality of second inputs are arranged as a plurality of pairs corresponding to a plurality of threads, wherein each thread includes one of the first inputs paired with one of the second inputs;
    schedule, by the processor, for each operation cycle of the processor, a certain thread of the plurality of threads for execution of a computation operation by each processor of the respective processing element of the multi-thread systolic array, wherein the scheduling is performed according to available impacting values of the certain thread based on analysing the received plurality of the first and second inputs;
    execute the computation operation for the certain thread by the computation component; and
    parallel execute a bypass operation for a first thread of other threads in the plurality of threads by the shifting path component, when at least one value of the first thread is a non-impacting value, and a stalling operation for a second thread of the other threads by the stalling component, when at least one value of the second thread is an impacting value, wherein the stalling operation comprises locally storing a set of values that are being stalled by the stalling operation associated with the second thread within the respective suspender queue, and
    wherein the bypassing is performed without execution of the computation operation.

2. The multi-thread systolic array according to claim 1, wherein the plurality of processing elements are arranged as a two dimensional array such that a plurality of first outputs of a first processing element are provided as the plurality of first inputs into a second adjacent processing element, and a plurality of second outputs of the first processing element are provided as the plurality of second inputs into a third adjacent processing element.

3. The multi-thread systolic array according to claim 2, wherein the processor of each of the plurality of processing elements is configured to shift non-impacting value inputs from the plurality of first inputs to the plurality of first outputs and from the plurality of second inputs to the plurality of second outputs.

4. The multi-thread systolic array according to claim 3, wherein the shifting of the non-impacting value inputs is performed without computing a multiplication of the non-impacting value inputs.

5. The multi-threaded systolic array according to claim 1, wherein the computation operation of the computation component is executed independently of the bypass operation of the shifting path component and the stalling operation of the stalling component.

6. The multi-thread systolic array according to claim 1, wherein the processor of each of the plurality of processing elements is configured to parallel process a plurality of bypass operations for the plurality of threads when the plurality of threads include non-impacting values.

7. The multi-thread systolic array according to claim 1, wherein the processor of each the plurality of processing elements is configured to perform the bypass operation for each thread of the plurality of threads that includes non-impacting values for respective first inputs and/or respective second inputs.

8. The multi-thread systolic array according to claim 1, wherein the processor of each of the plurality of processing elements is configured to assign different layers of a neural network to different threads of the plurality of threads, and to select between the different threads according to a bandwidth of the corresponding layer, wherein a first input denotes activation input of the neural network and a second input denotes weights of the neural network.

9. The multi-thread systolic array according to claim 1, wherein each of the plurality of processing elements includes at least one first suspension buffer storing data for the first inputs and at least one second suspension buffer storing data for the second inputs when the processor of the respective processing element is busy processing the certain thread.

10. The multi-thread systolic array according to claim 1, wherein a clock of a computation component executing the computation operation is gated when the first inputs and the second inputs have an impacting value.

11. The multi-thread systolic array according to claim 1, wherein the multi-thread systolic array is configured to compute a plurality of matrix multiplications from data provided by the plurality of threads.

12. The multi-thread systolic array according to claim 1, wherein a result of the computation operation is one of: locally stored at each of the processing elements and shifted as output to second and third adjacent ones of the plurality of processing elements, and used as a partial sum input for a next computation from a corresponding certain first input and a corresponding certain second input.

13. The multi-thread systolic array according to claim 1, wherein the non- impacting value is a zero input value that does not impact other values when the computation operation is executed.

14. The multi-thread systolic array according to claim 1, wherein the suspender queue is implemented as a set of common queues.

15. The multi-thread systolic array according to claim 14, wherein each value of the set of values is stored in a corresponding common queue of the set of common queues.

16. The multi-thread systolic array according to claim 1, wherein the set of values comprises the at least one value of the second thread.

17. A method of operating a multi-thread systolic array comprising:
performing for each processing element of a plurality of processing elements of the multi-thread systolic array, each processing element including a processor, a first input interface, a second input interface, a computation component, a shifting path component, a stalling component and a respective suspender queue for each input of the plurality of processing element:
receiving a plurality of first inputs by the first input interface from a respective first input source;
receiving a plurality of second inputs by the second input interface from a respective second input source,
wherein the plurality of first inputs and the plurality of second inputs are arranged as a plurality of pairs corresponding to a plurality of threads, wherein each thread includes one of the first inputs paired with one of the second inputs;
scheduling, by the processor, for each operation cycle, a certain thread of the plurality of threads for execution a computation operation by each processor of the respective processing element of the multi-thread systolic array,
wherein the scheduling is performed according to available impacting values of the certain thread based on analysing the received plurality of the first and second inputs; and
executing the computation operation for the certain thread by the computation component, wherein the processor is configured to execute the computation operation for the certain thread and in parallel, execute a bypass operation for at least a first thread of other threads in the plurality of threads by the shifting component, when at least one of the values of the first thread is a non-impacting value, and a stalling operation for a second thread of the other threads by the stalling component, when at least one of the values of the second thread is an impacting value, wherein the stalling operation comprises locally storing a set of values that are being stalled by the stalling operation associated with the second thread within the respective suspender queue, and wherein the bypassing is performed without execution of the computation operation.

18. A non-transitory computer readable medium comprising computer code, which when executed by one or more processing elements, each processing element including a processor, a first input interface, a second input interface, a computation component, a shifting path component, a stalling component and a respective suspender queue for each input of the one or more processing element, cause the respective one or more processing elements to:
receive a plurality of first inputs by the first input interface from a respective first input source;
receive a plurality of second inputs by the second input interface from a respective second input source, wherein the plurality of first inputs and the plurality of second inputs are arranged as a plurality of pairs corresponding to a plurality of threads;
schedule, by the processor, for each operation cycle, a certain thread of the plurality of threads, wherein the scheduling is performed according to available impacting values of the certain thread based on analysing he received plurality of the first and second inputs; and
execute a computation operation for the certain thread by the computation component; and
parallel execute the computation operation for the certain thread and execute for each respective thread of the other threads, a bypass operation for a first thread of other threads in the plurality of threads by the shifting path component, when at least one value of the first thread is a non-impacting value, and a stalling operation for a second thread of the other threads by the stalling component, when the at least one value of the second thread is an impacting value, wherein the stalling operation comprises locally storing a set of values that are being stalled by the stalling operation associated with the second thread within the respective suspender queue, and wherein the bypassing is performed without execution of the computation operation.

* * * * *